(12) United States Patent
Nakata et al.

(10) Patent No.: US 9,934,815 B2
(45) Date of Patent: Apr. 3, 2018

(54) OPTICAL DISC APPARATUS AND OPTICAL DISC REPRODUCTION METHOD

(71) Applicant: Panasonic Intellectual Property Management Co., Ltd., Osaka (JP)

(72) Inventors: Kohei Nakata, Nara (JP); Yasumori Hino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/172,579

(22) Filed: Jun. 3, 2016

(65) Prior Publication Data

US 2016/0284380 A1 Sep. 29, 2016

Related U.S. Application Data

(63) Continuation of application No. PCT/JP2014/004613, filed on Sep. 9, 2014.

(30) Foreign Application Priority Data

Jan. 17, 2014 (JP) .................................. 2014-006555

(51) Int. Cl.
*G11B 20/10* (2006.01)
*G11B 7/005* (2006.01)
(Continued)

(52) U.S. Cl.
CPC ........ *G11B 20/10222* (2013.01); *G11B 7/005* (2013.01); *G11B 20/10009* (2013.01);
(Continued)

(58) Field of Classification Search
None
See application file for complete search history.

(56) References Cited

U.S. PATENT DOCUMENTS

2007/0237059 A1 10/2007 Kasahara
2009/0180368 A1 7/2009 Miyashita et al.
(Continued)

FOREIGN PATENT DOCUMENTS

JP 2002-237138 8/2002
JP 2008-176898 7/2008
(Continued)

OTHER PUBLICATIONS

International Search Report dated Nov. 18, 2014 in International (PCT) Application No. PCT/JP2014/004613.

*Primary Examiner* — Brian Butcher
(74) *Attorney, Agent, or Firm* — Wenderoth, Lind & Ponack, L.L.P.

(57) ABSTRACT

An optical disc apparatus includes a synchronizer that generates a reproduction clock signal synchronized with a reproduction signal of information recorded in an optical disc medium, and generates a digital reproduction signal synchronized with the reproduction clock signal, an adaptive equalizer that generates a post-adaptive-equalization digital reproduction signal, and a maximum likelihood decoder that performs maximum likelihood decoding of the post-adaptive-equalization digital reproduction signal to generate a binary signal. The apparatus also includes an expected waveform generator that generates an expected waveform from the binary signal, a phase-advance waveform generator that generates a phase-advance waveform, a phase-delay waveform generator that generates a phase-delay waveform, and a metric detector that detects a phase error. In the optical disc apparatus, the synchronizer controls the phase of the digital reproduction signal using the phase error.

10 Claims, 9 Drawing Sheets

(51) Int. Cl.
*G11B 20/14* (2006.01)
*G11B 7/0037* (2006.01)

(52) U.S. Cl.
CPC .. *G11B 20/10037* (2013.01); *G11B 20/10046* (2013.01); *G11B 20/14* (2013.01); *G11B 7/0037* (2013.01)

(56) References Cited

U.S. PATENT DOCUMENTS

| | | |
|---|---|---|
| 2010/0149940 A1 | 6/2010 | Nakata et al. |
| 2010/0169730 A1 | 7/2010 | Kimura |
| 2011/0096652 A1 | 4/2011 | Miyashita et al. |

FOREIGN PATENT DOCUMENTS

| | | |
|---|---|---|
| JP | 2009-176405 | 8/2009 |
| JP | 2010-170651 | 8/2010 |
| JP | 2012-226795 | 11/2012 |
| WO | 2007/037272 | 4/2007 |

OPTICAL DISC APPARATUS AND OPTICAL DISC REPRODUCTION METHOD

BACKGROUND

1. Technical Field

The present disclosure relates to an optical disc medium in which data is optically recorded, and an optical disc apparatus and an optical disc reproduction method for recording and reproducing the data in and from the optical disc medium.

2. Description of Related Art

Currently, various types of optical disc mediums such as a DVD and a Blu-ray (registered trademark) disc (hereinafter, referred to as a BD) have been used as an information recording medium for storing a video image or data. These optical disc mediums have higher storage reliability than a hard disk drive or a magnetic tape. Therefore, usage of the optical disc medium is expanding from conventional storage of AV (Audio and Video) data such as a video image and a sound to long-term data storage.

However, a capacity of the data that can be stored per volume of the optical disc medium is about one-third of the hard disk drive or magnetic tape. Therefore, from the viewpoint of space efficiency during storage, there is a demand for improving the capacity of the data that can be stored per volume without increasing cost of the optical disc medium, and research and development is actively continued. Recently, among BDs, a BDXL (registered trademark) disc having recording density of about 33.4 GB per layer is released as an optical disc medium having the highest volume recording density.

Such an optical disc medium can store data for at least 50 years, and the optical disc mediums having the storage reliability greater than or equal to 10 times a lifetime of about 5 years of the hard disk drive from the viewpoint of long-term data storage. The data for the long-term storage is transferred from the hard disk drive to the optical disc medium, which allows a balance between the long-term storage reliability and reduction of storage cost to be established. Particularly, compared with the hard disk drive in which the power is consumed during the data storage, in the optical disc medium in which no power is required during the data storage, an amount of carbon dioxide emission can be reduced as a green storage, and therefore data center power consumption that becomes a major issue can be reduced.

However, even in the BDXL disc having the highest recording density among the optical disc mediums, the capacity of the data that can be stored per volume is about one-third of the hard disk drive. Compared with the hard disk drive, a more storage space is required for the optical disc medium during the data storage. Particularly, for the usage in a data center where cost demands related to a storage space are high, there is a demand for improving the recording density per volume of the optical disc medium.

A signal processing technology of increasing linear density of recording data is well known as the technology of improving the recording density per volume of the optical disc medium. A PRML (Partial Response Maximum Likelihood) system is generally used as the signal processing method for increasing the linear density.

The PRML system is a technology in which a Partial Response (PR) and Maximum Likelihood decoding (ML) are combined, and is a system in which a most probable signal series is selected from a reproduction waveform based on occurrence of a well-known intersymbol interference. Therefore, a decoding capability is known to be improved compared with a conventional level determination system. With increasing linear density of the optical disc medium, degradations of the intersymbol interference and an SNR (Signal-Noise Ratio) become further problematic.

A high-order PRML system may be used as the PRML system in order to maintain the reproduction capability. For example, in the case that the BD having a diameter of 12 cm has the recording density of 25 GB per recording layer of the optical disc medium, the reproduction capability can be maintained by adopting a PR(1,2,2,1) ML system. A PR(1,2,2,2,1) ML system is adopted for the BDXL disc having the recording density of 33.4 GB per recording layer.

In the PRML system, binary digital data is decoded from the reproduction signal. In order to perform the digital signal processing, a reproduction clock signal is generated by sampling the reproduction signal in synchronization with the reproduction signal in each channel bit. Generally, information on the reproduction clock signal is included in an edge of a recording mark. The reproduction clock signal synchronized with the reproduction signal is generated by detecting phase information on advance or delay of the edge from a portion corresponding to the edge of the digital reproduction signal sampled in synchronization with the reproduction signal. For the BDXL disc, the proper phase information can hardly be detected only from the edge. However, in the PRML system, there is disclosed a technology of detecting the phase information to generate the stable reproduction clock signal using metrics of a plurality of points since a set of signal series diverge from a certain state until passages of the set of signal series converge (for example, see Unexamined Japanese Patent Publication No. 2009-176405).

For the PR (1,2,2,2,1) ML system, a width of the intersymbol interference spreads back and forth up to 2T. Therefore, using an RLL(1,7) modulation rule in which the minimum pitch of the recording mark and a space becomes 2T, a pattern is restricted, and one piece of phase information can correctly be detected at one edge.

However, in the case that the linear density of the recording layer per layer is increased more than or equal to 50 GB, the intersymbol interference is significantly widened, the plurality of pieces of phase information obtained from the edges of the recording marks overlap with each other, the correct phase information is hardly detected. As a result, the correct reproduction clock signal can hardly be generated, and an error having an influence on a binary determination of the PRML system is increased to degrade a bit error rate. In the worst case, the reproduction signal and the reproduction clock signal are hardly synchronized with each other, and the reproduction can hardly be performed.

SUMMARY

The present disclosure was made for solving the problems and an object of the present disclosure is to provide an optical disc apparatus that can stably generate the reproduction clock signal to increase the linear density without degrading the reproduction capability.

The optical disc apparatus of the present disclosure is an optical disc apparatus that reproduces information recorded in an optical disc medium, the optical disc apparatus including: a synchronizer that generates a reproduction clock signal synchronized with a reproduction signal obtained from the information, and generates a digital reproduction signal synchronized with the reproduction clock signal; an adaptive equalizer that shapes a waveform of the digital reproduction signal to generate a post-adaptive-equalization digital reproduction signal; a maximum likelihood decoder that performs maximum likelihood decoding of the post-adaptive-equalization digital reproduction signal to generate a binary signal; an expected waveform generator that generates an expected waveform from the binary signal having a time width of 2LT with respect to a time width of LT of an impulse response waveform of the digital reproduction signal; a phase-advance waveform generator that generates a phase-advance waveform in which a phase of the expected waveform is advanced by 1T; a phase-delay waveform generator that generates a phase-delay waveform in which the phase of the expected waveform is delayed by 1T; and a metric detector that detects a phase error between the reproduction signal and the reproduction clock signal based on a metric value calculated from each of the post-adaptive-equalization digital reproduction signal, the expected waveform, the phase-advance waveform, and the phase-delay waveform at an interval of ±(L/2)T from a center of the binary signal having the time width of 2LT. The synchronizer controls a phase of the digital reproduction signal using the phase error.

According to the present disclosure, the information on the phase error between the reproduction signal and the reproduction clock signal is correctly detected from the state in which the influences of the plurality of edges overlap with each other due to the widened intersymbol interference, and the stable reproduction clock signal can be generated. The data recorded in the optical disc medium can be reproduced without degrading the reproduction capability, and the linear density can be increased during the recording of the data.

DESCRIPTION

Hereinafter, an exemplary embodiment will be described in detail with reference to the drawings. However, the detailed description beyond necessity is occasionally omitted. For example, the detailed description of the well-known matter or the overlapping description of the substantially same configuration is occasionally omitted.

This is because unnecessary redundancy of the following description is avoided for the purpose of the easy understanding of those skilled in the art.

The accompanying drawings and the following description are provided in order that those skilled in the art sufficiently understand the present disclosure, and the claims are not limited to the accompanying drawings and the following description.

First Exemplary Embodiment

Figure 1:
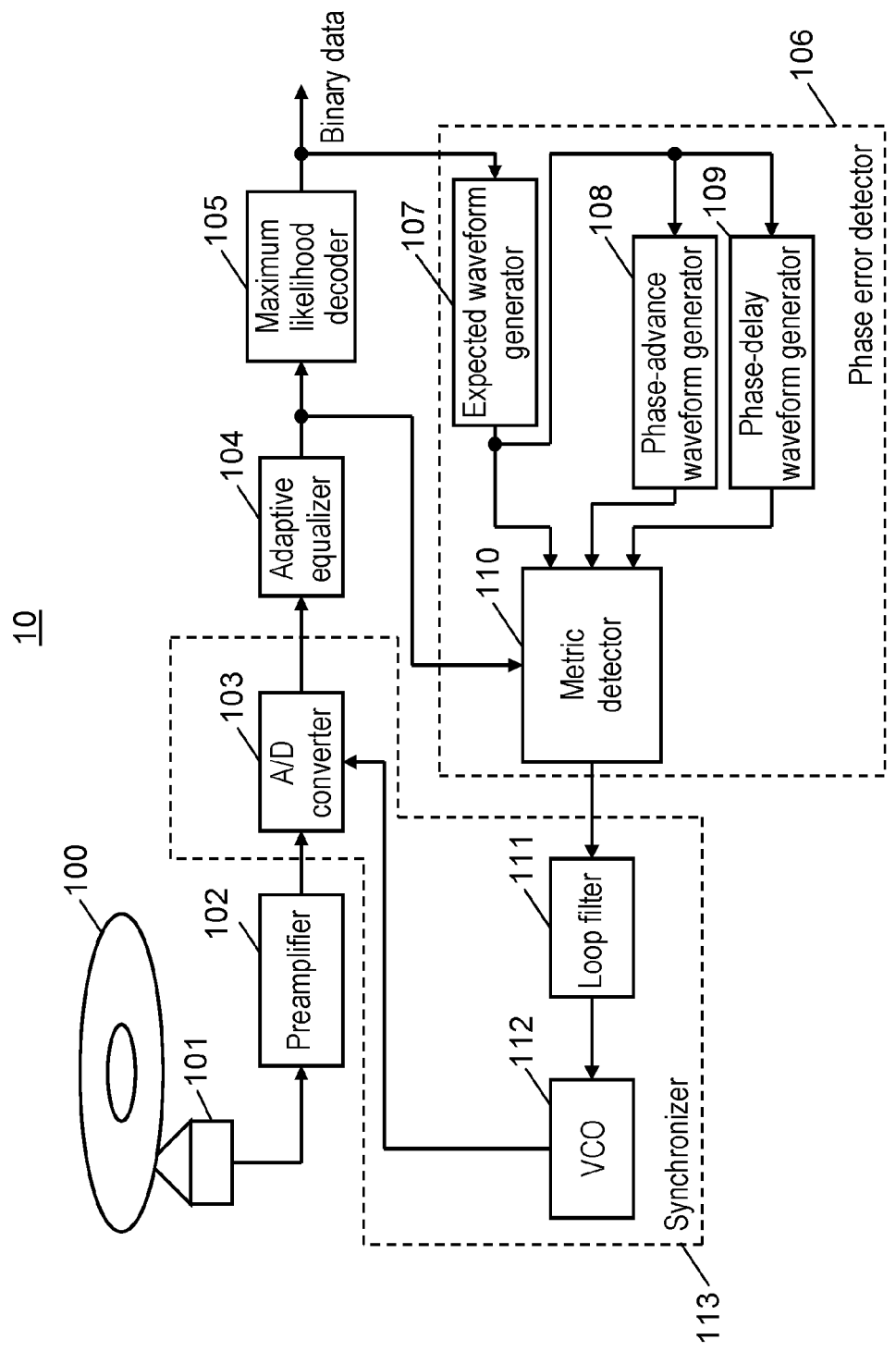
FIG. 1 is a view illustrating a configuration of an optical disc apparatus according to a first exemplary embodiment of the present disclosure.

FIG. 1 is a view illustrating a configuration of optical disc apparatus 10 according to a first exemplary embodiment. Optical disc apparatus 10 includes optical head 101, preamplifier 102, A/D converter 103, adaptive equalizer 104, maximum likelihood decoder 105, phase error detector 106, loop filter 111, and VCO (Voltage-Controlled Oscillator) 112.

Optical head 101 generates a reproduction signal used to reproduce data read from optical disc medium 100. A servo controller (not illustrated) controls optical head 101 and a spindle motor (not illustrated) rotating optical disc medium 100 such that a light beam emitted from optical head 101 is focused on a track provided on optical disc medium 100 and such that optical disc medium 100 is scanned with the light beam are performed, and the servo controller also performs moving control for gaining access to a target track.

Preamplifier 102 amplifies the reproduction signal generated by optical head 101 such that the reproduction signal becomes a predetermined amplitude. Preamplifier 102 also performs filtering processing in which a signal component of the reproduction signal is amplified to suppress a noise component.

A/D converter 103 samples the reproduction signal in synchronization with a reproduction clock signal generated by VCO 112, and outputs a digital reproduction signal.

Adaptive equalizer 104 adaptively performs equalization processing such that a frequency characteristic of the digital reproduction signal becomes a predetermined frequency characteristic, and adaptive equalizer 104 generates a post-adaptive-equalization digital reproduction signal. For example, adaptive equalizer 104 is constituted by an FIR (Finite Impulse Response) filter. A tap coefficient of the FIR filter is controlled using an LMS (Least Mean Square) algorithm such that an error between a signal output from the FIR filter and an expected waveform having the previously-fixed predetermined frequency characteristic deceases.

Maximum likelihood decoder 105 performs maximum likelihood decoding on the adaptively-equalized digital reproduction signal to generate binary data indicating a result of the maximum likelihood decoding. For example, a Viterbi decoder or a BCJR (Bahl-Cocke-Jeinek-Raviv) decoder is used as maximum likelihood decoder 105. That is, maximum likelihood decoder 105 decodes the digital reproduction signal to output the binary data by the maximum likelihood decoding in which a most probable series is estimated from the metric value between the expected waveform based on the previously-fixed predetermined frequency characteristic and the digital reproduction signal. The binary data output from maximum likelihood decoder 105 is further subjected to demodulation and error correction processing, and information recorded in optical disc medium 100 is reproduced.

Based on the digital reproduction signal and the binary data, phase error detector 106 detects a phase error between the reproduction signal and the reproduction clock signal. Phase error detector 106 includes expected waveform generator 107 that generates the expected waveform from the binary data based on the previously-fixed predetermined frequency characteristic, phase-advance waveform generator 108 that generates the expected waveform in which a phase is advanced, phase-delay waveform generator 109 that generates the expected waveform in which the phase is delayed, and metric detector 110 that calculates a phase error based on a metric value of each of the digital reproduction signal, the expected waveform, the phase-advance waveform, and the phase-delay waveform.

Loop filter 111 removes an unnecessary frequency band component from the phase error, which is detected while the reproduction is performed, and outputs a reproduction clock control signal controlling VCO 112.

VCO 112 is an oscillator that generates the reproduction clock signal at a frequency based on reproduction clock control signal. VCO 112, phase error detector 106, and loop filter 111 constitute a PLL (Phase Locked Loop), which is controlled by a feedback loop, so as to generate the reproduction clock signal synchronized with the reproduction signal. A/D converter 103 samples the reproduction signal using the reproduction clock signal, which is generated such that the phase error becomes zero. Therefore, when adaptive equalizer 104 and maximum likelihood decoder 105 decode the binary data, an error component decreases to stably obtain a decoding capability.

At this point, A/D converter 103, loop filter 111, and VCO 112 are collected in synchronizer 113 having a configuration generating the reproduction clock signal synchronized with the digital reproduction signal, namely, a configuration synchronizing the reproduction clock signal and the digital reproduction signal with each other.

A reproduction clock signal generating operation performed by optical disc apparatus 10 of the first exemplary embodiment will be described below.

Adaptive equalizer 104 and maximum likelihood decoder 105 compare the expected waveform to the digital reproduction signal based on the previously-fixed frequency characteristic, thereby decoding the binary data.

As to the previously-fixed frequency characteristic, for example, for the BDXL disc, an impulse response waveform having a time width of 5T in which the signal value has a series (1,2,2,2,1) is used as the expected waveform when a mark having a length of 1T exists in the binary data. In the linear density of the BDXL disc, because of a small number of states, divergence and convergence of the passage of the signal series are simple in the maximum likelihood decoding, and the phase error corresponding to an edge of a recording mark can be extracted while a pattern is limited.

On the other hand, when the linear density of the recording data is further increased, the time width of the signal value series of the impulse response waveform is lengthened, and an amount of change of the signal value series to a summation of the signal value decreases extremely. Therefore, a convolution operation of many pieces of binary data and the impulse response waveform is performed in calculating the expected waveform, and the number of states fixing the signal value is exponentially increased. Since the number of states fixing the signal value is exponentially increased, a passage of the signal series is significantly complicated, and the phase error can hardly be extracted while limiting to the edge of the one recording mark.

Phase error detector 106 calculates the metric value at an interval based on the time width of the impulse response waveform using the expected waveform, the phase-advance waveform in which the phase of the expected waveform is advanced, and the phase-delay waveform in which the phase is delayed. Accordingly, the phase error is not affected by the increase of the number of states because the phase error is detected without particularly limiting the pattern.

Figure 2:
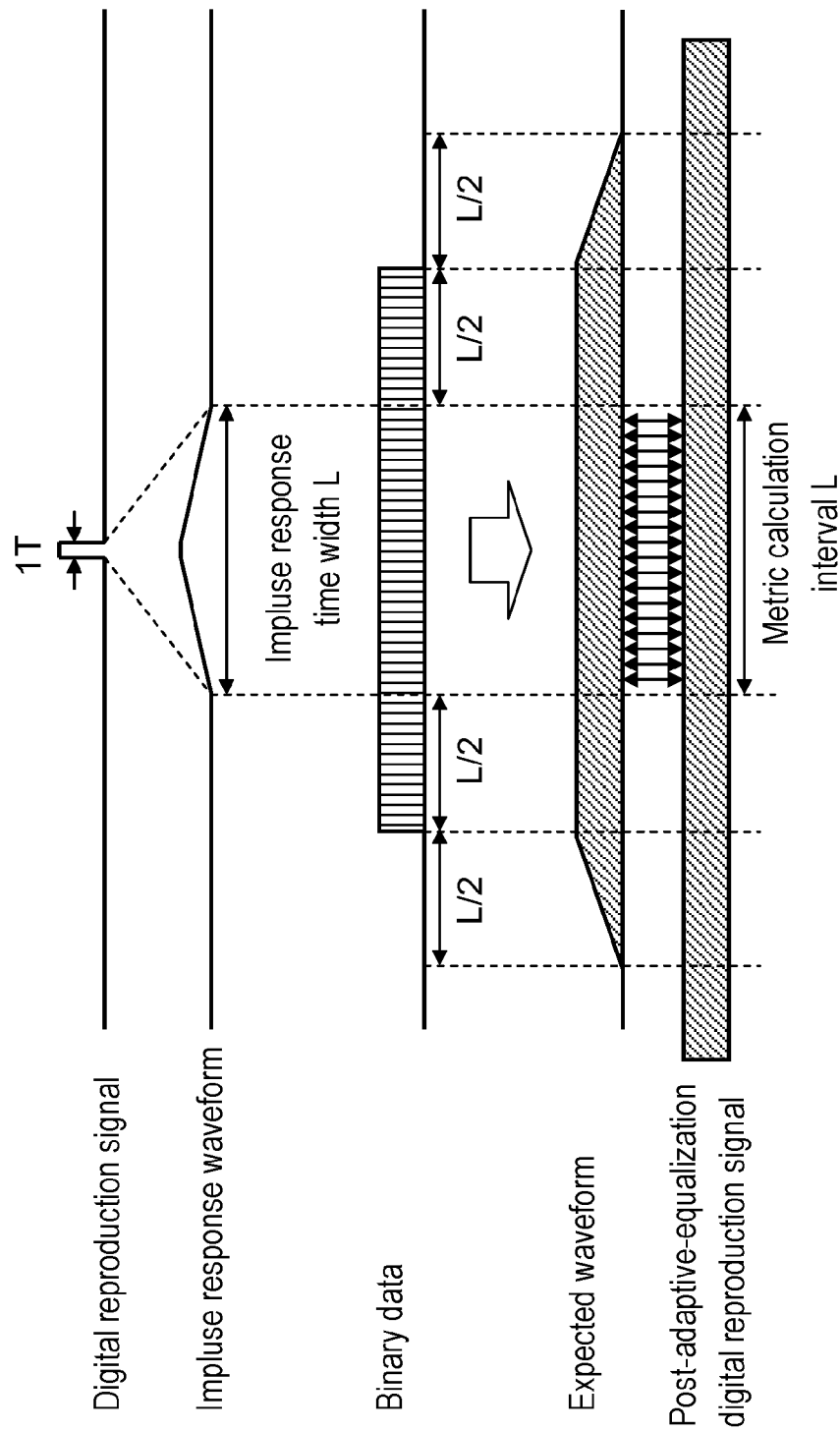
FIG. 2 is a view illustrating phase error detection in the first exemplary embodiment of the present disclosure.

FIG. 2 is a view illustrating phase error detection in the first exemplary embodiment. As illustrated in FIG. 2, the expected waveform is generated by the convolution operation of the impulse response waveform, which is obtained with respect to the digital reproduction signal having the length of 1T, and the binary data.

Assuming that L is a time width of the impulse response waveform, the binary data having a length of 2LT is used to generate the expected waveform. For this reason, the past binary data having the length of 2LT decoded up to this time by maximum likelihood decoder 105 is used. The expected waveform having the length of 3LT is generated by the convolution operation of the binary data having the length of 2LT and the impulse response waveform. The actual binary data is continued back and forth in addition to the length of 2LT. Accordingly, the expected waveform can correctly be generated with respect to the actual binary data only at an interval of $\pm(L/2)T$ corresponding to the time width of L of the impulse response waveform from a center position of the binary data having the length of 2LT. The post-adaptive-equalization digital reproduction signal and the expected waveform can properly be compared to each other at the interval of $\pm(L/2)T$, and the metric value is calculated at the interval of $\pm(L/2)T$.

Expected waveform generator 107 generates the expected waveform based on the binary data and impulse response waveform at the interval of 2LT. Phase-advance waveform generator 108 generates the phase-advance waveform in which the expected waveform generated by expected waveform generator 107 is advanced by a time of 1T. Phase-delay waveform generator 109 generates the phase-delay waveform in which the expected waveform generated by expected waveform generator 107 is delayed by the time of 1T. Metric detector 110 calculates the metric value at the interval of $\pm(L/2)T$. The metric value is a summation of square of a signal value difference at the identical time position. The calculated metric value includes metric value R of the post-adaptive-equalization digital reproduction signal and the expected waveform, metric value P of the post-adaptive-equalization digital reproduction signal and the phase-advance waveform, metric value Q of the post-adaptive-equalization digital reproduction signal and the phase-delay waveform, metric value Pw of the expected waveform and the phase-advance waveform, and metric value Qw of the expected waveform and the phase-delay waveform. Using the metric values, phase error Ph is calculated from the following equation (1).

$$Ph=((P-R)/Pw+(R-Q)/Qw)/2 \qquad \text{equation (1)}$$

In the equation (1), metric value Pw and metric value Qw are used as a denominator to normalize a metric value difference between the patterns, and sensitivity detected as the phase error is kept constant. When timing at present time at which the sampling is performed using the reproduction clock signal coincides with timing of the expected waveform in A/D converter 103, Ph=0 is obtained. When the timing at present time at which the sampling is performed using the reproduction clock signal is earlier than the timing of the expected waveform, Ph<0 is obtained. On the other hand, when the timing at present time at which the sampling is performed using the reproduction clock signal is later than the timing of the expected waveform, the phase error is obtained as Ph>0.

A frequency of the reproduction clock signal in VCO 112 is controlled such that phase error Ph decreases, which allows the reproduction signal and the reproduction clock signal to be synchronized with each other.

One of the problems with the reproduction signal processing in the increased linear density is that an intersymbol interference is increased, namely, the time width of the impulse response waveform is increased. In order to extract the information included in the reproduction signal, it is necessary to perform the signal processing within a range where the time width of the impulse response waveform is surely covered. In the conventional method in which only the signal value at the edge position of the digital reproduction signal is used, an S/N capability possessed by the reproduction signal can hardly effectively be utilized when a pieces of information on the plurality of edges interfere and mix with each other. Therefore, the detected phase error becomes incorrect, and the stable reproduction clock signal can hardly be generated. On the other hand, in the present disclosure, the expected waveform is generated from the binary data at the interval of 2LT, and the metric value is calculated at the interval of ±(L/2)T that is the center portion of the interval of 2LT. Therefore, the time width of the impulse response waveform is covered, the whole S/N capability possessed by the reproduction signal is effectively utilized, and the correct phase error can be obtained. Accordingly, the stable reproduction clock signal can be generated even if the linear density is increased.

In the conventional method, because the S/N capability possessed by the reproduction signal can hardly effectively be utilized, it is necessary to limit the pattern to be detected in order to detect the correct phase error. Additionally, the conventional method can hardly deal with the linear density. In the present disclosure, it is not necessary to limit the pattern to be detected, because the time width in which the signal processing is performed is sufficiently ensured such that the S/N capability possessed by the reproduction signal can effectively be utilized. However, because the information on the phase error can hardly be detected unless the signal value of the reproduction signal changes, it is necessary that the time width in which the signal processing is performed be greater than or equal to the time width of the impulse response waveform, and include the changes of the mark and spaces based on a modulation rule for the recorded data. The time width in which the signal processing is performed enables the phase error to be detected from all the patterns including the plurality of edges, and the phase error can correctly be detected from a comparison of the phase-advance waveform and phase-delay waveform, in which the expected waveform is shifted forward and backward by 1T, unlike the conventional method in which the pattern is limited. Because of the elimination of the necessity to limit the pattern, the phase error can easily be detected independently of the number of states of the signal value of the expected waveform, the number of states of the signal value being exponentially increased by the increased linear density.

The case that the correct phase error can hardly be detected during the detection of the phase error will be described below.

Phase error detector 106 detects the phase error based on the comparison of the post-adaptive-equalization digital reproduction signal and the expected waveform at the long signal interval. Therefore, in the case that adaptive equalizer 104 is low in adaptation because of a transition state, or in the case that the reproduction signal has a large strain, the large error is generated in the signal value irrespective of the phase error between the reproduction signal and the reproduction clock signal, and the detected value of the phase error becomes incorrect. In the case that a mistake exists in the binary data of maximum likelihood decoder 105, the error is also generated, and the phase error becomes incorrect.

Figure 3:
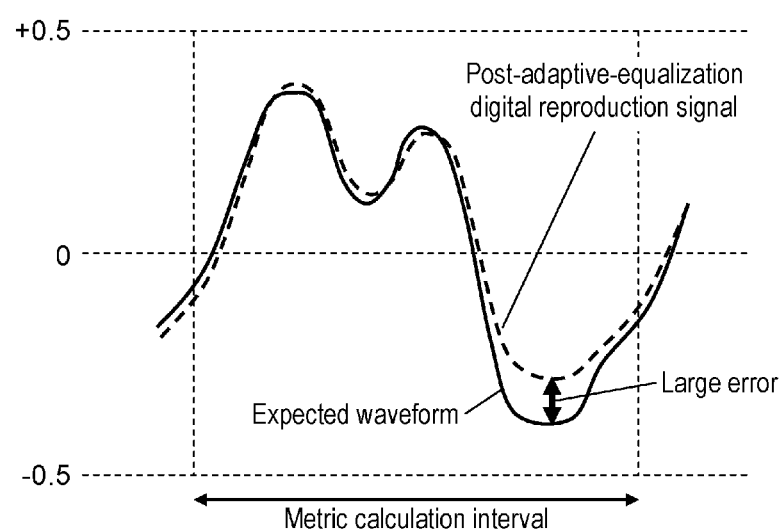
FIG. 3 is a view illustrating a situation in which a large error is generated between a post-adaptive-equalization digital reproduction signal and a signal value of an expected waveform in the first exemplary embodiment of the present disclosure.

FIG. 3 is a view illustrating a situation in which a large error is generated between the post-adaptive-equalization digital reproduction signal and the signal value of the expected waveform in the first exemplary embodiment. In FIG. 3, a dotted line indicates the post-adaptive-equalization digital reproduction signal, a solid line indicates the signal value of the expected waveform, and the large error exists at a metric calculation interval. At this point, assuming that ±0.5 is a maximum amplitude that can be taken by the expected waveform, the difference of the signal value between the two waveforms is removed to calculate the metric value when the difference of the signal value is greater than or equal to 0.2. Using only a portion having a small error cause, the correct phase error can be detected by performing the removal processing.

The amplitude of the reproduction signal changes according to a focusing state of the light beam emitted from optical head 101 to the track provided on optical disc medium 100. The frequency characteristic of the reproduction signal changes according to a wavelength of the light beam of optical head 101 and an NA (Numerical Aperture) of a lens with which the light beam is focused. Preamplifier 102 and adaptive equalizer 104 adaptively perform the signal processing on these changes such that a predetermined signal amplitude and a predetermined frequency characteristic are obtained. However, in the transition state in which the adaptive signal processing settles down to a sufficient state, the adaptive signal processing easily causes the error during the detection of the phase error or a disturbance to the synchronization of the reproduction clock signal. In order to reduce the error cause, the difference of the signal value between the two waveforms that are not included in the calculation of the metric value is not fixed to 0.2, but the difference of the signal value is set to 0.1 until the adaptive signal processing settles down to the sufficient state, and the removal processing may be performed so as to be sensitive to the error cause.

Another case that the correct phase error can hardly be detected will be described below.

For example, in the linear density of the BDXL disc, because 2T exceeds an optical resolution limit, the amplitude of the reproduction signal becomes zero, and the amplitude is obtained greater than or equal to 3T. When the linear density is further increased, the amplitude of the reproduction signal is not obtained even in 3T or 4T. For this reason, in the data pattern continued in 2T to 4T, the change of the signal value of the reproduction signal is extremely small, and the signal value difference caused by the phase shift of the reproduction clock signal also becomes extremely small. In the high-frequency region, a gain of the reproduction signal is extremely small, the S/N becomes small, and a noise included in the reproduction signal largely causes the incorrect value of the detected phase error.

Figure 4:
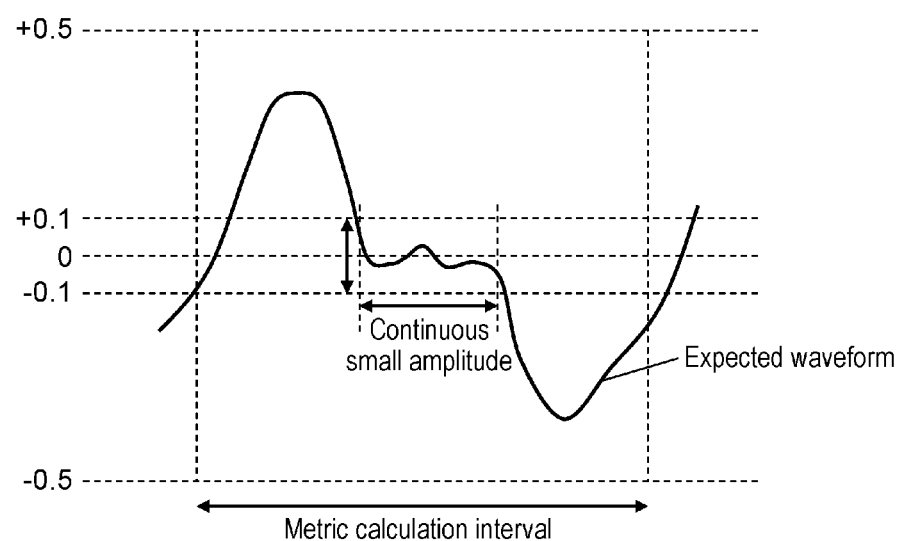
FIG. 4 is a view illustrating the expected waveform including a high-frequency component having a high possibility of increasing an influence of a noise in the first exemplary embodiment of the present disclosure.

FIG. 4 is a view illustrating the expected waveform including a high-frequency component having a high possibility of increasing an influence of the noise in the first exemplary embodiment. Assuming that ±0.5 is the maximum amplitude that can be taken by the expected waveform at the metric calculation interval, the signal value of the expected waveform falls within the range of ±0.1, and a portion in which the small amplitude is continued for a predetermined time or more exists at the metric calculation interval. In the portion, the difference between the two signal values is removed to calculate the metric value. Using only the portion having the good S/N, the correct phase error can be detected by performing the removal processing.

Thus, although the high-frequency component having the small change of the reproduction signal and the small S/N exists considerably, the continuous state of the high-frequency component can be limited by the modulation rule of the recording data. For example, in an RLL(1,7) modulation rule used in the BD, the number of shortest 2 Ts is limited to six times in row. In the case that the linear density is increased, the use of the modulation rule that limits the continuous state including 3T or 4T increases the high-S/N portion in which the correct phase error can be detected, and easily generates the stable reproduction clock signal.

In the case that many high-frequency components having the small change of the reproduction signal are included, metric values Pw and Qw become extremely small. In the case that the denominator has the extremely small value compared with an average value of metric values Pw and Qw, the error components included in metric values P, Q, and R obtained from the digital reproduction signal are amplified. As a result, the frequency of the reproduction clock signal is temporarily largely moved by the incorrect information, which leads to the degradation of the reproduction capability.

In order to remove the unstable cause, the phase error is set to zero without calculating the phase error from the metric value in the case that metric value Pw or Qw is smaller than a predetermined threshold. In a situation in which the reproduction signal has the low S/N, the stability is achieved by setting the predetermined threshold for metric values Pw and Qw to a value higher than a usual value.

Figure 5:
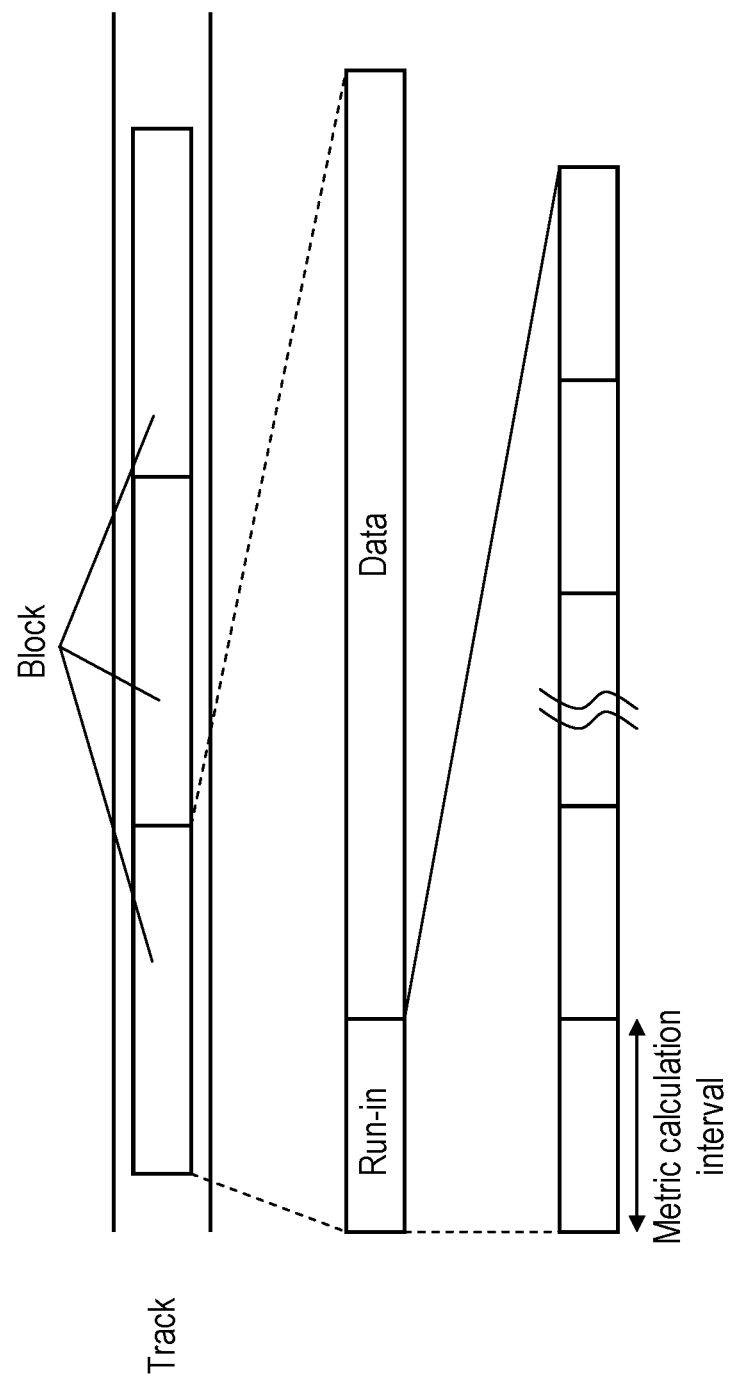
FIG. 5 is a view illustrating a format of a data block recorded in an optical disc medium of the first exemplary embodiment of the present disclosure.

FIG. 5 is a view illustrating a format of a data block recorded in optical disc medium 100. The data recorded in optical disc medium 100 is subjected to error correction coding in units of predetermined blocks and modulated according to a predetermined modulation rule. A run-in region is added to a head of the block. In the run-in region, a simple pattern is repeatedly recorded such that preamplifier 102 and adaptive equalizer 104 easily control the signal amplitude and frequency characteristic, and such that the initial synchronization of the reproduction clock signal is easily performed in the PLL. In FIG. 5, the data is recorded in units of blocks on the track of optical disc medium 100. One block is constituted by run-in and data.

In phase error detector 106, as described above, metric values Pw and Qw have the influence on the stability of the phase error. Desirably the changes of metric values Pw and Qw are small in order to stably perform an initial pull-in operation of the PLL in a short period. Specifically, in FIG. 5, when the identical pattern is repeatedly recorded at each metric calculation interval that is the phase error detecting interval, metric values Pw and Qw always become identical to each other. When metric values Pw and Qw are identical to each other, the phase error can stably be detected. When the pull-in operation of the PLL is stably performed, the run-in region is shortened and reduced, so that a recording capacity of optical disc medium 100 can effectively be used.

As described above, the information on the phase error between the reproduction signal and the reproduction clock signal is correctly detected from the state in which the influences of the plurality of edges overlap with each other due to the widened intersymbol interference, which is the problem of the reproduction signal processing in the increased linear density, and the stable reproduction clock signal can be generated. The data recorded in the optical disc medium can be reproduced without degrading the reproduction capability, and the linear density can be increased during the recording of the data.

In the first exemplary embodiment, synchronizer 113 of optical disc apparatus 10 is configured to obtain the synchronized digital reproduction signal with respect to the reproduction signal using the reproduction clock signal and A/D converter 103, however it is not limited to the configuration. For example, instead of synchronizer 113, the A/D converter converts the reproduction signal into the digital reproduction signal using a separately-generated clock signal, the FIR filter that controls the phase of the digital reproduction signal is provided such that the detected phase error becomes zero, and the synchronized digital reproduction signal may be obtained from an output of the FIR filter.

Figure 6:
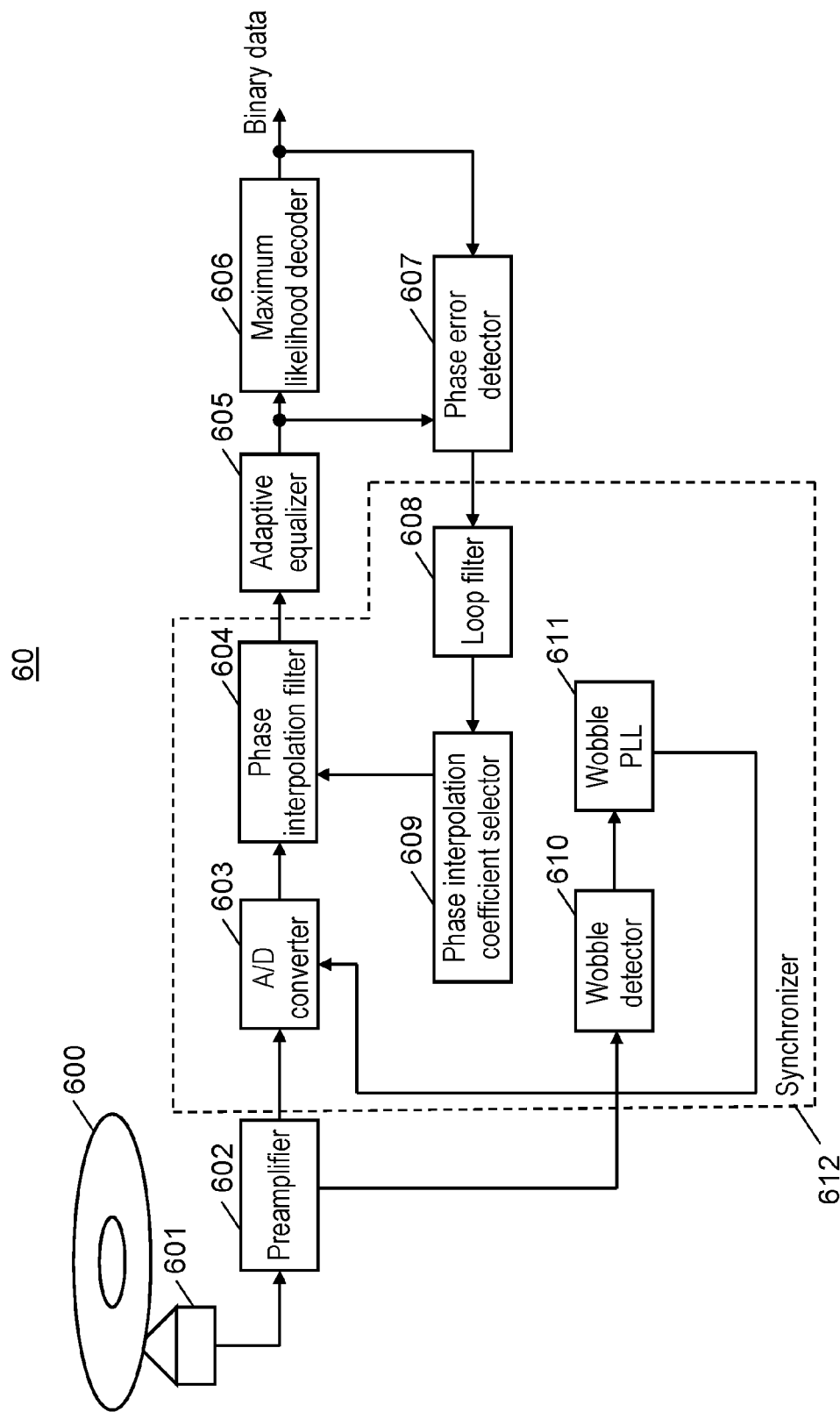
FIG. 6 is a view illustrating a configuration of another optical disc apparatus according to the first exemplary embodiment of the present disclosure.

FIG. 6 is a view illustrating a configuration of another optical disc apparatus 60 according to the first exemplary embodiment. Optical disc apparatus 60 has a configuration in which the FIR filter is provided to control the phase of the digital reproduction signal.

Similarly to the first exemplary embodiment, optical disc apparatus 60 in FIG. 6 includes optical head 601, preamplifier 602, A/D converter 603, adaptive equalizer 605, maximum likelihood decoder 606, phase error detector 607, and loop filter 608. Optical disc apparatus 60 further includes phase interpolation filter 604, phase interpolation coefficient selector 609, wobble detector 610, and wobble PLL 611. Based on a wobble signal obtained from a meandering track of optical disc medium 600, optical disc apparatus 60 operates A/D converter 603 using a wobble reproduction clock generated by wobble PLL 611. For example, International Patent Publication No. 2007/037272 discloses the configuration.

At this point, A/D converter 603, phase interpolation filter 604, loop filter 608, phase interpolation coefficient selector 609, wobble detector 610, and wobble PLL 611 are collected in synchronizer 612 having a configuration generating the digital reproduction signal synchronized using the generated reproduction clock signal, namely, a configuration synchronizing the reproduction clock signal and the digital reproduction signal with each other.

Wobble detector 610 detects a meandering component of the track included in the reproduction signal output from optical head 601 as the wobble signal. A meandering frequency of the track is sufficiently low compared with the data recorded in the track, and the good wobble signal is easy to detect. Wobble PLL 611 multiplies the wobble signal as a predetermined ratio to generate the wobble reproduction clock having a period equal to 1T of the data. The wobble reproduction clock is highly stable because the wobble reproduction clock is generated from the good wobble signal.

However, because the wobble reproduction clock is not synchronized with the phase at the boundary of 1T of the data with respect to the reproduction signal of the data, the digital reproduction signal obtained by A/D converter 603 using the wobble reproduction clock does not become an ideal synchronization state in adaptive equalizer 605 and maximum likelihood decoder 606. Phase interpolation filter 604 is an FIR filter that outputs the digital reproduction signal in which a phase synchronization deviation is corrected. Phase interpolation coefficient selector 609 controls the tap coefficient of phase interpolation filter 604. The tap coefficient is obtained using a SINC function. The phase error detected by phase error detector 607 is input to loop filter 608. Loop filter 608 includes a primary integrator, and integrates the phase error to output a value multiplied by a predetermined gain to phase interpolation coefficient selector 609 as the phase control value. According to the input phase control value, phase interpolation coefficient selector 609 selects the tap coefficient obtained from the SINC function, and outputs the selected tap coefficient to phase interpolation filter 604. Using the tap coefficient, phase interpolation filter 604 corrects the phase deviation of the input digital reproduction signal, and outputs the digital reproduction signal in the phase synchronization state.

Figure 7A:
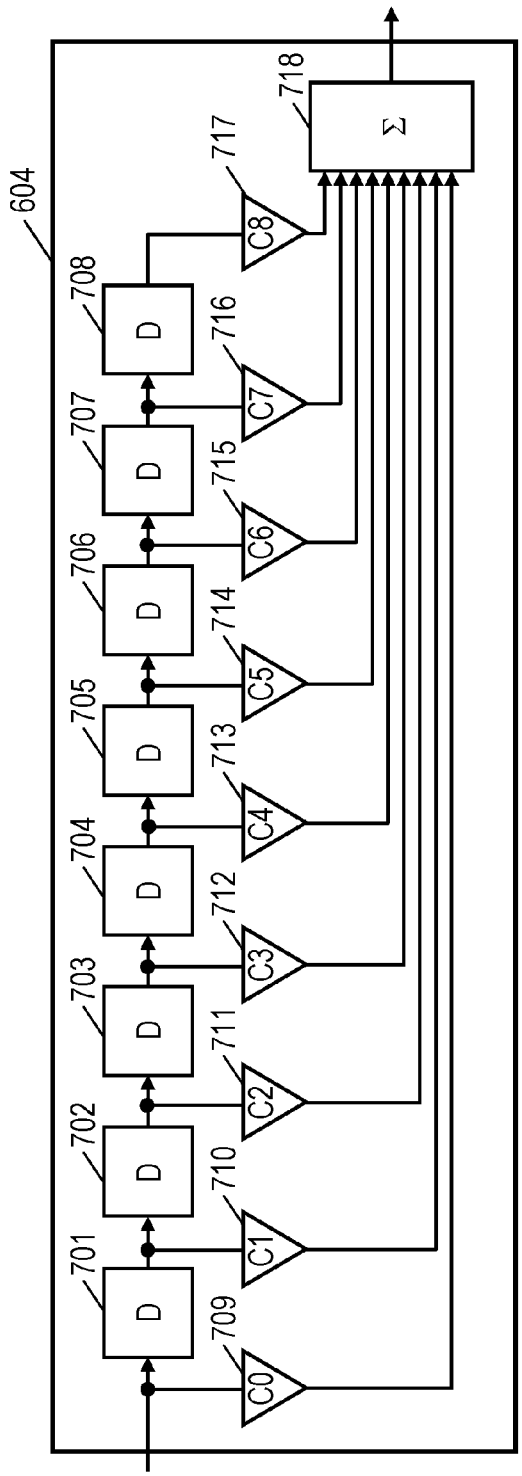
FIG. 7A is a view illustrating a phase interpolation filter in the first exemplary embodiment of the present disclosure.
Figure 7B:
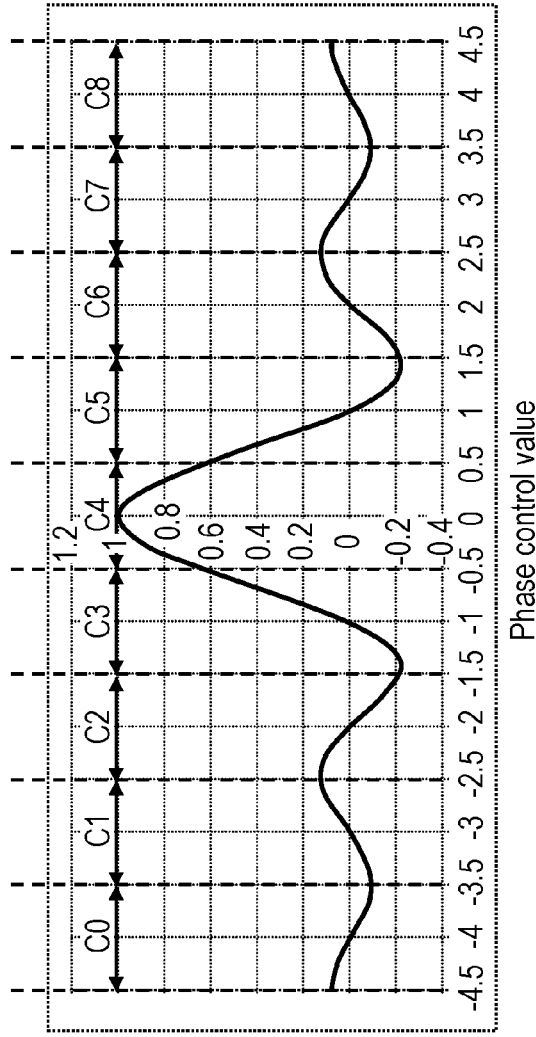
FIG. 7B is a view illustrating a coefficient control curve of a phase interpolation filter in the first exemplary embodiment of the present disclosure.

FIG. 7A is a view illustrating phase interpolation filter 604 of the first exemplary embodiment, and FIG. 7B is a view illustrating a coefficient control curve of phase interpolation filter 604 of the first exemplary embodiment.

Phase interpolation filter 604 is an FIR filter including series-connected delay units 701 to 708, multipliers 709 to 717, and adder 718. Delay units 701 to 708 delay the digital data signal value in each period of the clock signal. Multiplier 709 to 717 multiplies values of delay units 701 to 708 by tap coefficients C1 to C8, respectively. Adder 718 adds the outputs of multipliers 709 to 717, and outputs the digital reproduction signal in which the phase synchronization deviation is corrected. For example, tap coefficients C1 to C8 are set based on a Nyquist interpolation characteristic illustrated in FIG. 7B.

In the configuration in FIG. 7A, because the wobble reproduction clock having the frequency coinciding with 1T of the data can easily obtained from the good wobble signal, the necessity to provide a wide capture range for the frequency error is eliminated to control only the phase deviation in the digital PLL including phase error detector 607, loop filter 608, phase interpolation coefficient selector 609, and phase interpolation filter 604. Although the control of both the frequency error and the phase error only from the phase error value detected by phase error detector 607 has a small margin with increasing linear density of the recording data, the necessity to control the frequency error is eliminated in the configuration in FIG. 7A, so that the configuration in FIG. 7A can deal with the increased linear density while the high stability is maintained.

Second Exemplary Embodiment

Figure 8:
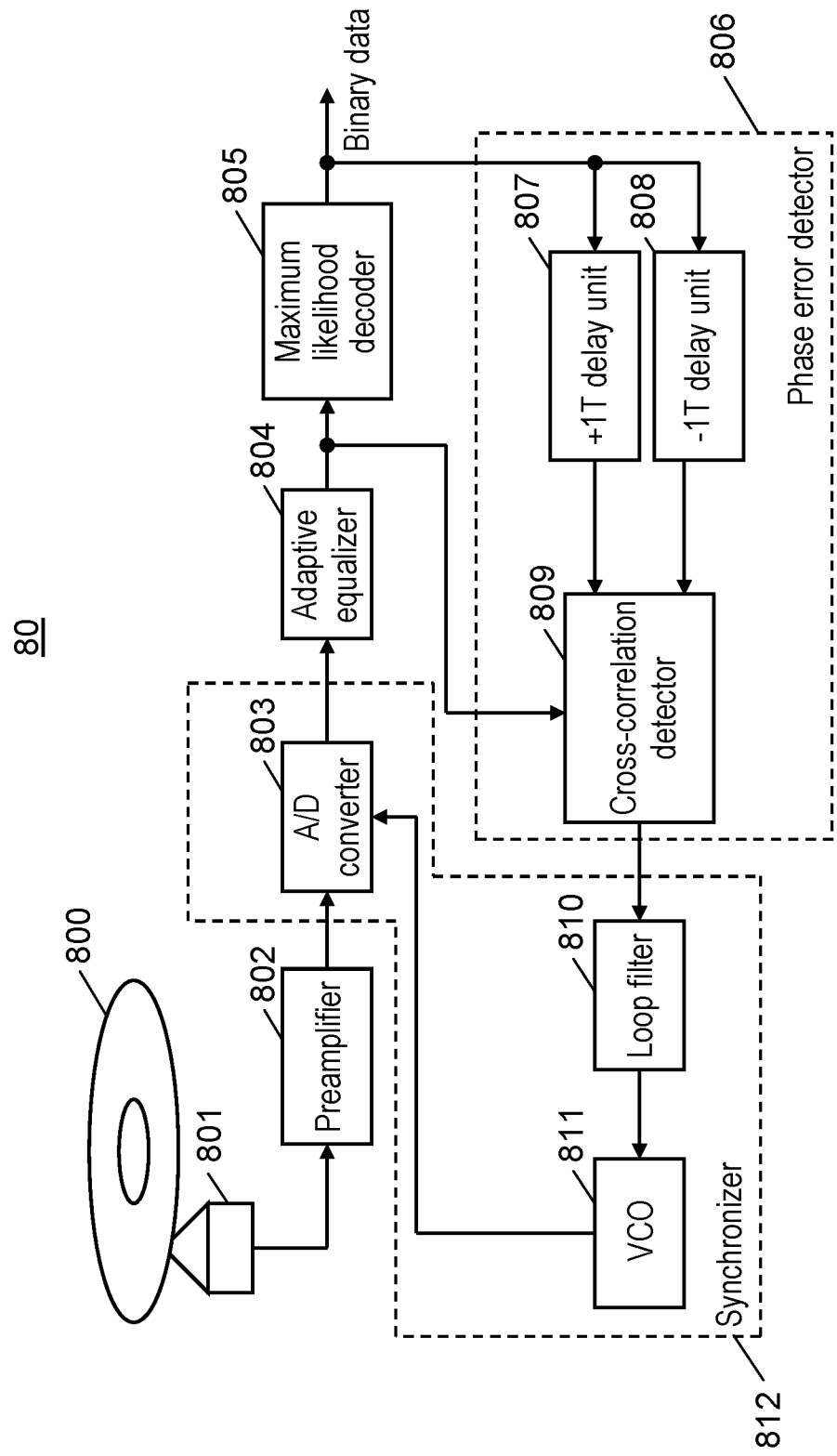
FIG. 8 is a view illustrating a configuration of an optical disc apparatus according to a second exemplary embodiment of the present disclosure.

FIG. 8 is a view illustrating a configuration of optical disc apparatus 80 according to a second exemplary embodiment of the present disclosure. Similarly to the first exemplary embodiment, optical disc apparatus 80 that reproduces the data read from optical disc medium 800 includes optical head 801, preamplifier 802, A/D converter 803, adaptive equalizer 804, maximum likelihood decoder 805, phase error detector 806, loop filter 810, and VCO 811. Similarly to the first exemplary embodiment, A/D converter 803, loop filter 810, and VCO 811 are collected in synchronizer 812 having a configuration generating the reproduction clock signal synchronized with the digital reproduction signal, namely, a configuration synchronizing the reproduction clock signal and the digital reproduction signal with each other. Since configurations except phase error detector 806 are identical to those of the first exemplary embodiment, the description is omitted.

Phase error detector 806 includes +1T delay unit 807, −1T delay unit 808, and cross-correlation detector 809. +1T delay unit 807 is a circuit that delays the binary data signal output from maximum likelihood decoder 805 by +1T. On the other hand, −1T delay unit 808 is a circuit that delays the binary data signal by −1T. Cross-correlation detector 809 calculates a cross-correlation between the adaptively-equalized digital reproduction signal output from adaptive equalizer 804 and the +1T-delay binary data signal of +1T delay unit 807 and a cross-correlation between the adaptively-equalized digital reproduction signal and the −1T-delay binary data signal of −1T delay unit 808, and outputs a difference between the two cross-correlations as a phase error value.

Figure 9:
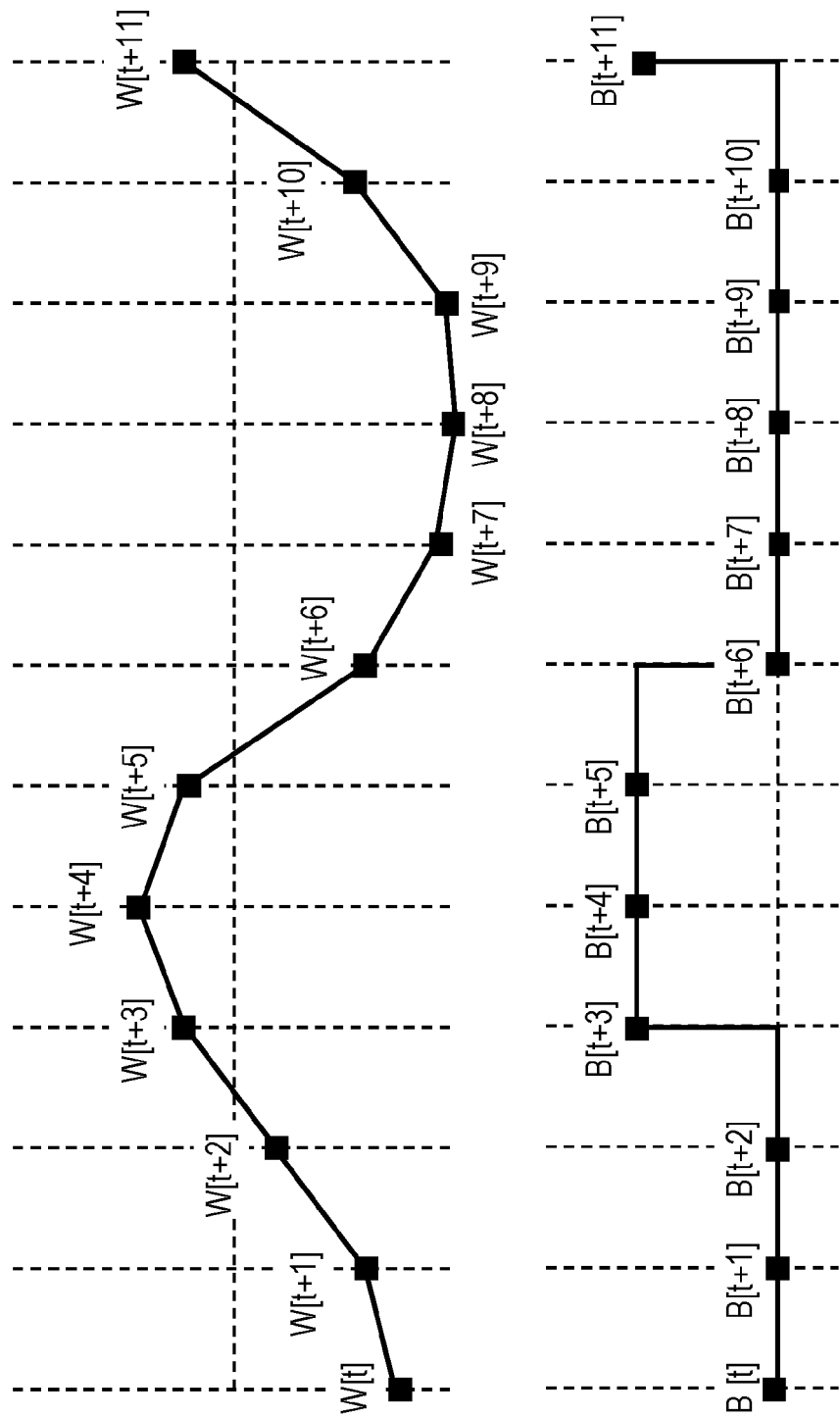
FIG. 9 is a view illustrating phase error detection performed by a cross-correlation detector of the second exemplary embodiment of the present disclosure.

FIG. 9 is a view illustrating the phase error detection performed by cross-correlation detector 809 of the second exemplary embodiment. Waveform W[T+i] (i is natural numbers of 1 to 11) indicates the adaptively-equalized digital reproduction signal. Waveform B[T+i] indicates the binary data signal output from maximum likelihood decoder 805. Cross-correlation detector 809 calculates a cross-correlation between adaptively-equalized digital reproduction signal W[T+i] and −1T-delay binary data signal B[T+(i−1)] as the digital reproduction signal, which is obtained during the reproduction of the digital signal of −1T, in the time width of L of the impulse response waveform. At this point, the −1T-delay binary data signal that is the binary signal of 0 and 1 is converted into the binary signal of −1 and 1 by the calculation of B[T+(i−1)]×2−1, which allows adaptively-equalized digital reproduction signal W[T+i] to be obtained by the simple addition and subtraction.

Similarly, a cross-correlation between adaptively-equalized digital reproduction signal W[T+i] and +1T-delay binary data signal B[T+(i+1)] is calculated in the time width of L.

Cross-correlation phase error Perr indicating whether the phase in which adaptively-equalized digital reproduction signal W[T+i] is sampled is deviated forward or backward with respect to binary data signal B[T+i] can be obtained by calculating the difference between the two cross-correlation values.

$$Perr = \sum_{i=1}^{L} (W[t+i] \times (B[t+(i-1)] \times 2 - 1)) - \sum_{i=1}^{L} (W[t+i] \times (B[t+(i+1)] \times 2 - 1))$$

[Mathematical formula 1]

where L is a time width of the impulse response waveform.

FIG. 9 illustrates the case of L=11 in Mathematical formula 1.

As described above, similarly to the first exemplary embodiment, the information on the phase error between the reproduction signal and the reproduction clock signal is correctly detected from the state in which the influences of the plurality of edges overlap with each other due to the widened intersymbol interference and the stable reproduction clock signal can be generated. The data recorded in the optical disc medium can be reproduced without degrading the reproduction capability, and the linear density can be increased during the recording of the data. Additionally, the linear density can be increased by a smaller operation circuit compared with the first exemplary embodiment.

In the second exemplary embodiment, synchronizer 812 of optical disc apparatus 80 is configured to obtain the synchronized digital reproduction signal with respect to the reproduction signal using the reproduction clock signal and A/D converter 803, but it is not limited to the configuration. As described in the first exemplary embodiment, instead of synchronizer 812, the A/D converter converts the reproduction signal into the digital reproduction signal using a separately-generated clock signal, the FIR filter that controls the phase of the digital reproduction signal is provided such that the detected phase error becomes zero, and the synchronized digital reproduction signal may be obtained from an output of the FIR filter. That is, synchronizer 612 of optical disc apparatus 60 in FIG. 6 may be used instead of synchronizer 812.

In the configuration, since the wobble reproduction clock having the frequency coinciding with 1T of the data can easily obtained from the good wobble signal, the necessity to provide the wide capture range for the frequency error is eliminated to control only the phase deviation in the digital PLL including phase error detector 806, loop filter 608, phase interpolation coefficient selector 609, and phase interpolation filter 604. Although the control of both the frequency error and the phase error only from the phase error value detected by phase error detector 806 has a small margin with increasing linear density of the recording data, the necessity to control the frequency error is eliminated in the configuration, so that the configuration of synchronizer 612 can deal with the increased linear density while the high stability is maintained.

The present disclosure is useful to the optical disc apparatus and the optical disc reproduction method for recording and reproducing the data in and from the optical disc medium with high linear density.

The invention claimed is:

1. An optical disc apparatus that reproduces information recorded in an optical disc medium, the optical disc apparatus comprising:
    a synchronizer that generates a reproduction clock signal synchronized with a reproduction signal obtained from the information, and generates a digital reproduction signal synchronized with the reproduction clock signal;
    an adaptive equalizer that shapes a waveform of the digital reproduction signal to generate a post-adaptive-equalization digital reproduction signal;
    a maximum likelihood decoder that performs maximum likelihood decoding of the post-adaptive-equalization digital reproduction signal to generate a binary signal;
    an expected waveform generator that generates an expected waveform from the binary signal having a time width of 2LT with respect to a time width of LT, which is a time width of an impulse response waveform of the digital reproduction signal;
    a phase-advance waveform generator that generates a phase-advance waveform in which a phase of the expected waveform is advanced by 1T;
    a phase-delay waveform generator that generates a phase-delay waveform in which the phase of the expected waveform is delayed by 1T; and
    a metric detector that detects a phase error between the reproduction signal and the reproduction clock signal based on a metric value calculated from each of the post-adaptive-equalization digital reproduction signal, the expected waveform, the phase-advance waveform, and the phase-delay waveform at an interval of ±(L/2)T from a center of the binary signal having the time width of 2LT,
    wherein the synchronizer controls a phase of the digital reproduction signal using the phase error.

2. The optical disc apparatus according to claim 1, wherein the synchronizer includes:
    an oscillator that generates the reproduction clock signal synchronized with the reproduction signal obtained from the information;
    an A/D converter that generates the digital reproduction signal synchronized with the reproduction clock signal; and
    a loop filter that controls the reproduction clock signal using the phase error.

3. The optical disc apparatus according to claim 1, wherein the metric detector calculates the metric value except for a portion in which a difference between the post-adaptive-equalization digital reproduction signal and a signal value of the expected waveform is equal to or greater than a predetermined threshold.

4. The optical disc apparatus according to claim 1, wherein the metric detector calculates the metric value except for a portion in which a signal value of the expected waveform falls within a predetermined amplitude range and an amplitude continues for a predetermined time or more.

5. The optical disc apparatus according to claim 1, wherein the synchronizer includes:
    a wobble detector that generates the reproduction clock signal from a wobble signal included in the reproduction signal obtained from the information;
    an A/D converter that generates the digital reproduction signal synchronized with the reproduction clock signal;
    a phase interpolation filter that corrects a phase deviation of the digital reproduction signal;
    a loop filter that generates a phase control value using the phase error to control the phase interpolation filter; and
    a phase interpolation coefficient selector that selects a filter coefficient of the phase interpolation filter based on the phase control value.

6. An optical disc apparatus that reproduces information recorded in an optical disc medium, the optical disc apparatus comprising:
    a synchronizer that generates a reproduction clock signal synchronized with a reproduction signal obtained from the information, and generates a digital reproduction signal synchronized with the reproduction clock signal;
    an adaptive equalizer that shapes a waveform of the digital reproduction signal to generate a post-adaptive-equalization digital reproduction signal;
    a maximum likelihood decoder that performs maximum likelihood decoding of the post-adaptive-equalization digital reproduction signal to generate a binary signal;
    a +1T delay unit that delays the binary signal by +1T to generate a +1T-delay binary data signal;
    a −1T delay unit that delays the binary signal by −1T to generate a −1T-delay binary data signal; and
    a cross-correlation detector that detects a cross-correlation phase error from a cross-correlation between the post-adaptive-equalization digital reproduction signal and the +1T-delay binary data signal and a cross-correlation between the post-adaptive-equalization digital reproduction signal and the −1T-delay binary data signal in a time width of LT, which is a time width of an impulse response waveform of the digital reproduction signal, the cross-correlation phase error indicating whether a phase in which the post-adaptive-equalization digital reproduction signal is sampled deviates forward or backward with respect to the binary signal,
    wherein the synchronizer controls a phase of the digital reproduction signal using the cross-correlation phase error.

7. The optical disc apparatus according to claim 6, wherein the synchronizer includes:

an oscillator that generates the reproduction clock signal synchronized with the reproduction signal obtained from the information;
an A/D converter that generates the digital reproduction signal synchronized with the reproduction clock signal; and
a loop filter that controls the reproduction clock signal using the cross-correlation phase error.

8. The optical disc apparatus according to claim 6, wherein the synchronizer includes:
a wobble detector that generates the reproduction clock signal from a wobble signal included in the reproduction signal obtained from the information;
an A/D converter that generates the digital reproduction signal synchronized with the reproduction clock signal;
a phase interpolation filter that corrects a phase deviation of the digital reproduction signal;
a loop filter that generates a phase control value using the phase error to control the phase interpolation filter; and
a phase interpolation coefficient selector that selects a filter coefficient of the phase interpolation filter based on the phase control value.

9. An optical disc reproduction method for reproducing information recorded in an optical disc medium, the optical disc reproduction method comprising the steps of:
reading-out from the optical disc medium in which the information is recorded to generate a reproduction signal;
generating a post-adaptive-equalization digital reproduction signal by shaping a waveform of a digital reproduction signal produced from the reproduction signal in synchronization with a reproduction clock signal;
performing maximum likelihood decoding of the post-adaptive-equalization digital reproduction signal to generate a binary signal;
generating an expected waveform from the binary signal having a time width of 2LT with respect to a time width of LT, which is a time width of an impulse response waveform of the digital reproduction signal;
generating a phase-advance waveform in which a phase of the expected waveform is advanced by 1T;
generating a phase-delay waveform in which the phase of the expected waveform is delayed by 1T;
detecting a phase error between the reproduction signal and the reproduction clock signal based on a metric value calculated from each of the post-adaptive-equalization digital reproduction signal, the expected waveform, the phase-advance waveform, and the phase-delay waveform at an interval of $\pm(L/2)T$ from a center of the binary signal having the time width of 2LT; and
controlling a phase of the digital reproduction signal using the phase error.

10. An optical disc reproduction method for reproducing information recorded in an optical disc medium, the optical disc reproduction method comprising the steps of:
reading-out from the optical disc medium in which the information is recorded to generate a reproduction signal;
generating a post-adaptive-equalization digital reproduction signal by shaping a waveform of a digital reproduction signal produced from the reproduction signal in synchronization with a reproduction clock signal;
performing maximum likelihood decoding of the post-adaptive-equalization digital reproduction signal to generate a binary signal;
delaying the binary signal by +1T to generate a +1T-delay binary data signal;
delaying the binary signal by −1T to generate a −1T-delay binary data signal;
detecting a cross-correlation phase error from a cross-correlation between the post-adaptive-equalization digital reproduction signal and the +1T-delay binary data signal and a cross-correlation between the post-adaptive-equalization digital reproduction signal and the −1T-delay binary data signal in a time width of LT, which is at time width of an impulse response waveform of the digital reproduction signal, the cross-correlation phase error indicating whether a phase in which the post-adaptive-equalization digital reproduction signal is sampled deviates forward or backward with respect to the binary signal; and
controlling the phase of the digital reproduction signal using the cross-correlation phase error.

* * * * *